Figure 1:
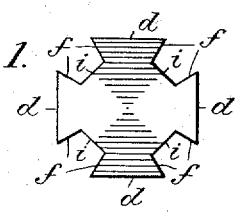

No. 12,483. REISSUED MAY 15, 1906.

A. W. NILSSON.

INTERLOCKING TILE FOR FLOOR OR WALL COVERINGS.

APPLICATION FILED MAR. 29, 1906.

Witnesses

Thomas J. Byrnes

A. S. Deinh

Inventor

Axel W. Nilsson,

By his Attorneys

Kerr, Page & Cooper

UNITED STATES PATENT OFFICE.

AXEL W. NILSSON, OF NEW YORK, N. Y.

INTERLOCKING TILE FOR FLOOR OR WALL COVERINGS.

No. 12,483. Specification of Reissued Letters Patent. Reissued May 15, 1906.

Original No. 750,779, dated January 26, 1904. Application for reissue filed March 29, 1906. Serial No. 308,815.

*To all whom it may concern:*

Be it known that I, AXEL W. NILSSON, a citizen of the United States, residing at New York, county and State of New York, have invented certain new and useful Improvements in Interlocking Tile for Floor or Wall Coverings, of which the following is a specification, reference being had to the drawings accompanying and forming part of the same.

The invention which forms the subject of the present application relates to floor-coverings composed of units or "tiles" which have tongues and recesses on their sides whereby when laid in position the same interlock to form, in effect, an integral sheet.

Heretofore, so far as I am aware, the only method of making a "pattern" in the completed covering has been to use units or tiles of different colors and assemble them in proper relative positions. The outline of the pattern thus formed is broken or uneven on account of the projecting tongues which extend from a tile of one color into a tile of another tint. This has met with objection from architects and builders and constitutes one of the chief drawbacks to floor-coverings of this character, in many instances being sufficient in the mind of a prospective user to overcome the advantages incident to the yielding or resilient material of which they are usually made and the many other advantages from the standpoint of economy and sanitation. I have therefore been led to devise my present invention, by which a variety of patterns may be formed from the same tiles by properly arranging them of even and unbroken outlines. The most suitable pattern for a rectangular space, which is the usual shape of rooms, corridors, &c., are those in which the right angle, its multiples, or its halves and quarters predominate, and I have therefore selected as the embodiment of my invention here illustrated tiles and patterns embracing such features.

To form "right-angle designs" with the desired evenness of outline, it is usually necessary that a certain proportion of the whole number of tiles be each made in two or more colors so arranged that the outlines of the colors on contiguous units will match. After considerable study and experiment I have found that the best results are produced by dividing the tile into an equal number of parts—say four—by lines intersecting at the center and coloring one or more of the divisions thus formed.

Another advantage incident to the embodiment herein described resides in the contour of the individual tiles. As is customary, I preferably use tiles of two different shapes; but in the present instance their configurations are such that the objectionable effect due to unevenness of outline when they are solidly colored and laid in patterns in the usual way is materially lessened and a more pleasing design produced.

To these and other ends my invention consists in the novel features and combinations herein described, and more particularly pointed out in the claims.

Figure 2:
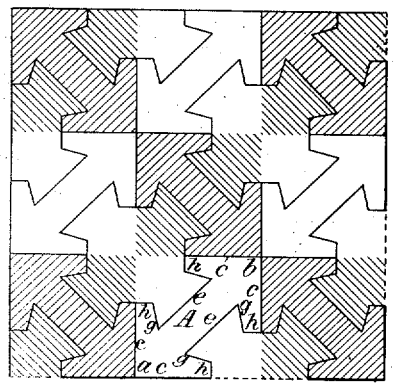
Figure 3:
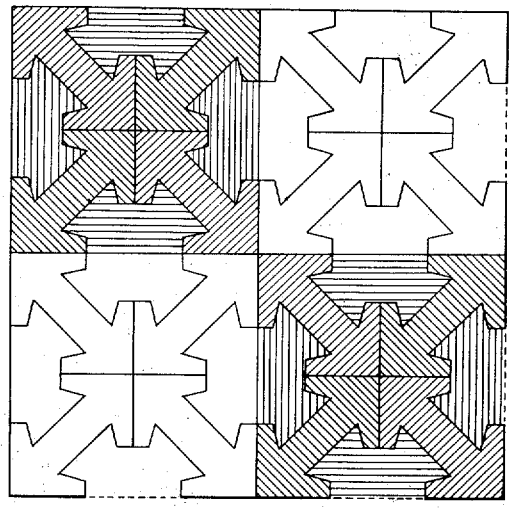
Figure 4:
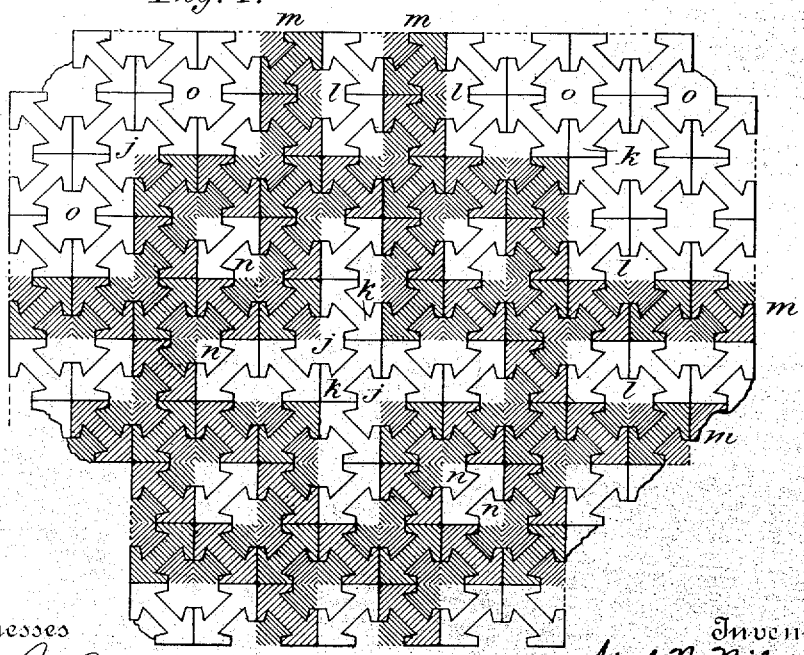

Figure 1 shows one kind of party-colored tile embodying my invention. Fig. 2 shows a block pattern made by using the tile shown in Fig. 1 interlocked with solidly-colored tiles. Fig. 3 is a block design in which the blocks are four times the size of those in Fig. 2, in this case the party-colored tiles being colored in halves; and Fig. 4 is a Grolier pattern made from solid and party units of various kinds.

The tile shown in Fig. 1 may for convenience be termed the "major" tile, since, as shown in the drawings, it is larger than the other tile employed with it, which other tile may for analogous reasons be termed the "minor" tile. The major tile has four outer sides (designated by *d*) arranged at right angles—that is to say, these sides produced would meet at right angles. Between adjacent sides are three-sided indentations, the three sides or edges thereof being indicated in Fig. 1 by *f* and *i*. The bases or innermost sides *i* are, it will be seen, at angles of forty-five degrees to the outer sides or edges *d* of the tile—that is, the sides *i* would, if produced, meet the sides or edges *d* at the angles mentioned. It will thus be seen that while the tile shown in Fig. 1 may be roughly described as a Maltese cross it has a distinctive form.

The other tile (indicated by A in Fig. 2) may be roughly described as a double-headed arrow. Its body portion or shank is elongated, and the sides *e e* thereof are parallel. Its ends are pointed, the sides *c c* being at right angles to each other. Projecting laterally from each end and also inwardly—that is, toward the center of the body portion of the tile—are extensions or prongs, the outer sides of which are formed by the edges *c* prolonged.

In the two tiles just described the edges *d* and *e* are equal and *f* and *g* are equal, while edges *h* of the extensions *x* are each respectively equal to one-half the edges *i*. It will therefore be evident that tiles of these shapes may be assembled as in Figs. 2, 3, and 4, forming a continuous surface, and it will be observed that the coöperating angles of the units are of such size and so arranged that the units interlock and none can be removed except by lifting it vertically from the surface. When the tiles are so colored that the outline of each is noticeable, the outline of the pattern thus produced is in a certain sense uneven; but the interlocking tongues and recesses are so large in comparison with the tiles themselves that the general effect is not objectionable. In another sense the design could be said to consist of Maltese crosses in a solid background, and from this point of view the outlines are perfectly even and unbroken. The distinction between the two considerations will in actual use depend a great deal on the contrast of the colors employed. Thus light crosses and dark arrows will make the latter more prominent, and the design will appear as a series of crossed lines, whereas with dark crosses and light arrows the former will be the more prominent.

Referring to patterns produced with party-colored tiles, it will be observed that by the use of units divided into four equal radial sections, the diametrically opposite divisions being colored differently from the other pair, as in Fig. 1, a block design, as shown in Fig. 2, may be made. In this case two or more different arrow-tiles are employed; but in no case are they party-colored. The division-lines between the sections on the crosses extend from the centers of the edges *i*, Fig. 1, and therefore match with the edges of the arrow, Fig. 2, as will be seen.

The larger block design of Fig. 3 is composed of solid arrows of two or more colors and crosses colored in halves. The two tiles match in each instance at the same point as before.

The Grolier pattern of Fig. 4 is made up of the same arrow-tiles as above and five different cross-units. Crosses *j j* have one section colored to form outer corners. On account of the odd number of blocks in each side of the outline-square the other corners may be formed by the meeting of four differently-colored arrow-tiles, as at *k k*. Crosses *l l* are colored in halves like those in Fig. 6 and are used in making continuous bands of solid color, as *m m*. Crosses *n n* have three sections colored to form the inside corners or angles. Other crosses, as *o o*, may be solid.

The above are of course only a few of the designs that may be produced with the aid of radially party-colored tiles. The tiles shown are of course typical merely of my invention, which may be variously embodied without departing from its proper scope.

What I claim is—

1. A floor or wall covering composed of tiles of the general shape of a Maltese cross having differently-colored parts arranged radially about the center, interlocked with tiles of the shape of a double-headed arrow, forming a pattern or design irrespective of the interlocked portions of the tiles, as set forth.

2. A floor or wall covering composed of interlocked solidly-colored tiles and tiles party-colored symmetrically and radially and having a pattern or design therein, the outlines thereof being formed by the colors on the tiles irrespective of the interlocked portions of the tiles.

3. As a new article of manufacture, a tile of the general form of a Maltese cross, having differently-colored parts thereon symmetrically arranged about the center of the tile for the purposes set forth.

4. A floor or wall covering, consisting of equidistantly-spaced major tiles, each having four outer sides at right angles and having three-sided indentations between adjacent outer sides, the bases or innermost sides of the indentations being at angles of forty-five degrees to the said outer sides; and interlocking minor tiles between the major tiles, each composed of a body portion with parallel sides and pointed ends and having at each end laterally and inwardly projecting extensions, said minor tiles being arranged in groups of four about a common center, end to end, with their extensions in contact and entering the indentations, in the adjacent major tiles and interlocking therewith; as set forth.

AXEL W. NILSSON.

Witnesses:

S. S. DUNHAM,

THOMAS J. BYRNES.